Patented June 13, 1944

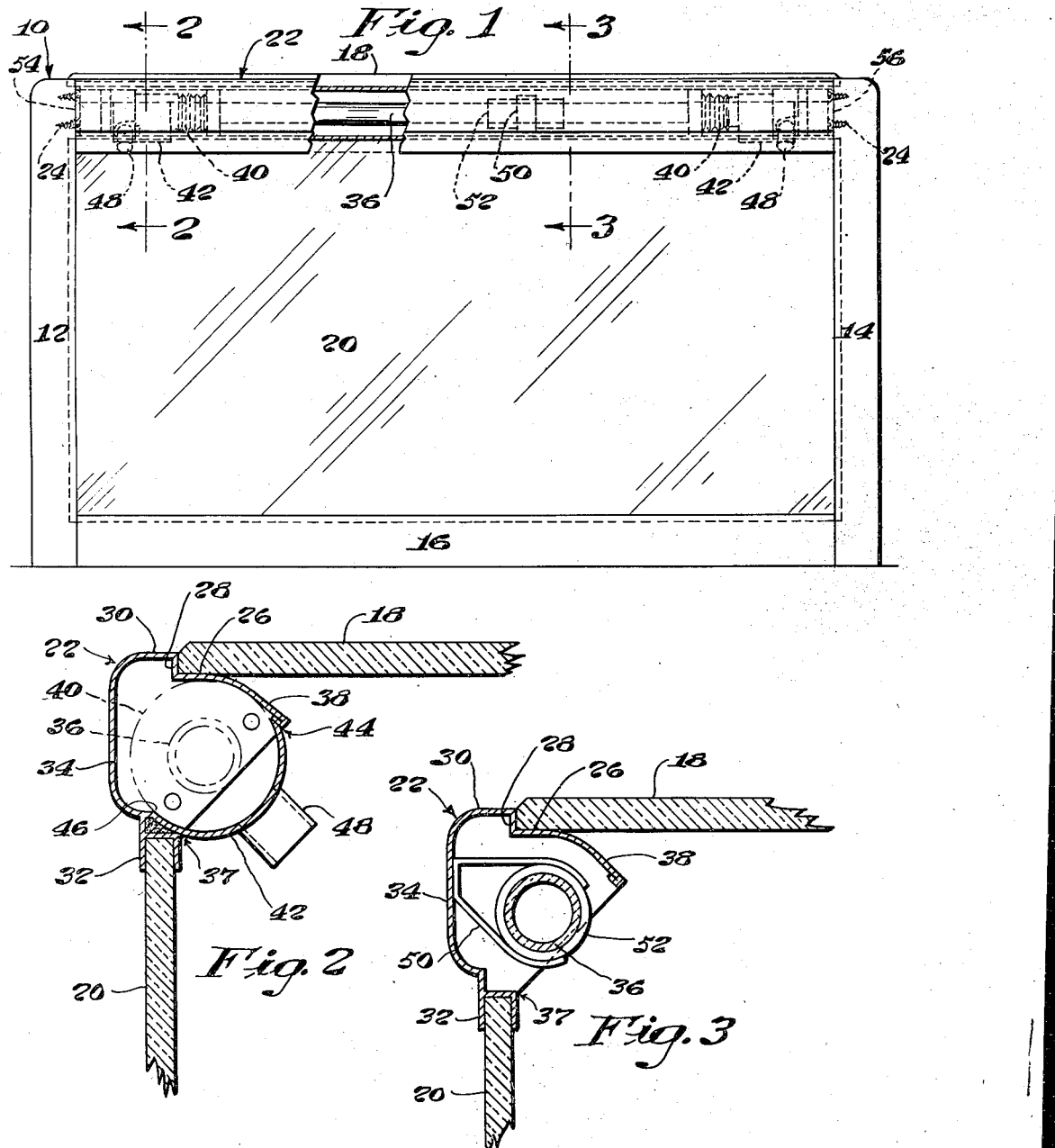

2,351,335

UNITED STATES PATENT OFFICE 2,351,335

ILLUMINATED SHOWCASE

John E. Holmes, Auburndale, Mass.

Application July 25, 1941, Serial No. 404,038

1 Claim. (Cl. 240—6)

This invention relates to an illuminated show case.

The invention has for an object to provide a novel and improved construction of a show case in which provision is made for illuminating the interior thereof in a novel and improved manner and wherein the illuminating unit is mounted within the show case in such a manner as to constitute a minimum obstruction to the customer's view of the interior of the show case.

Another object of the invention is to provide a novel and improved construction of a show case wherein the front rail thereof, forming a part of the frame of the structure and supporting the adjacent edges of the top and front glass panels, also serves as a reflector and a supporting member for the illuminating element.

A further object of the invention is to provide a novel and improved illuminated show case particularly adapted for storage and display of goods under refrigeration in which the illuminating element comprises a cold cathode fluorescent tube.

With these general objects in view and such others as may hereinafter appear, the invention consists in the illuminated show case and in the various structures, arrangements and combinations of parts hereinafter described and particularly defined in the claim at the end of this specification.

In the drawing illustrating the preferred embodiment of the invention, Fig. 1 is a front elevation of a show case embodying the present invention; Fig. 2 is a cross-sectional view on the line 2—2 of Fig. 1; and Fig. 3 is a similar view taken on the line 3—3 of Fig. 1.

In general, the present invention contemplates a show case in which provision is made for illuminating the interior thereof in a novel and improved manner and whose construction is such as to permit of a maximum view of the interior of the show case from the position of a normal observer standing in front of the show case. Heretofore, illuminating elements placed within the interior of the show case have been subject to several disadvantages in that the illuminating unit and the shielding members provided therefor either failed to properly shield the light from the observer or the salesperson behind the show case, or the shielding members were of necessity so large as to cut off a substantial portion of the observer's vision of the interior of the show case. For example, a lighting element mounted within the show case and along the upper front edge thereof might with its shielding member occupy a width of three inches or more along such edge which, when considering the angle of vision of the observer standing in front of the show case, would cut off the observer's view of from six inches to one foot or more in width of the interior of the show case depending upon the distance of the observer from the show case. The excessive width of the illuminating element and its shielding member was sometimes further accentuated by the width of the frame member or front rail of the show case, thus detracting to a considerable degree from the utility of the show case for the display of goods. In addition, incandescent lamps heretofore employed, have radiated heat in such amounts as to render their use objectionable in many instances.

In accordance with the present invention, the illuminating element may and preferably will comprise an elongated relatively narrow fluorescent tube incorporated within a hollow frame member comprising one or more of the front rails of the show case. In its preferred form, the invention contemplates a structure wherein the top front rail of the show case is relatively narrow and serves to support the adjacent edges of the top and front glass panels and also serves as a shield or reflector for the fluorescent tube supported therein. Another feature of the present invention resides in the use of a cold cathode fluorescent tube which renders the illuminating unit suitable for use in commercial show cases and particularly in a refrigerating show case.

Referring now to the drawing, 10 represents a show case for the storage or display purposes and which may comprise any usual or preferred frame structure including the side rails 12, 14 and base member 16 for supporting the glass panels 18, 20. In accordance with the present invention, the upper front rail indicated generally at 22 comprises a hollow elongated member which may be secured to the side rails 12, 14 by screws 24, as illustrated, and which is open at its inner side as shown.

Preferably, the front rail 22 is relatively narrow and is arranged to support the adjacent edges of the top and front glass panels 18, 20 of the show case. The top glass panel 18 is supported in a recess 26 formed by an offset 28 in the upper wall 30 of the front rail, and a groove 32, formed integrally with the front wall 34, is provided to receive the upper edge of the front glass panel 20, as illustrated.

The illuminating element 36 herein shown preferably comprises an elongated and relatively narrow cold cathode fluorescent tube which is received within the hollow portion of the front rail so that the latter may serve as a reflector for illuminating the interior of the show case and as a shield to prevent any glare from the tube from being directed toward the observer standing in front of or in the rear of the show case. The upper wall of the front rail adjacent the recess 26 is continued toward the rear of the show case and curved over as shown at 38 for a relatively short distance to shield the light from the top glass panel 18. Thus, the interior of the hollow front rail is open between the inner edge 37 of the lower grooved portion 32 and the curved portion 38 to permit the rays of light to pass into the interior of the show case. The exterior surfaces of the front rail comprising the top and front walls 30, 34 may assume a contour in harmony with the general design of the show case so that to an observer it is not apparent that the rail contains the lighting element. In contrast with the usual arrangement heretofore employed for illuminating the interior of the show case, and which occupied a space of at least three inches in width, the present combined rail and reflecting member may be constructed so as to occupy a space of approximately one and one quarter inches in width or less, so as to present a minimum obstruction to one's view of the interior of the show case. The interior surfaces of the rail may be finished in white enamel or lacquer or lined with sheet asbestos to provide a suitable reflecting surface. The rail may be made of relatively thin metal either rolled or extruded or may be constructed of plastics if desired. In the latter instance desirable illuminating effects may be obtained utilizing translucent plastics.

Provision is made for supporting the fluorescent tube 36 within the rail, and as herein shown, each end of the front rail is arranged to receive standard porcelain sockets 40. The socket retaining portion may comprise an arcuate member 42 soldered or brazed along one edge 44 to the extended edge 38 of the rail member to form a continuation thereof, the other edge 46 being similarly attached to the top 37 of the groove portion 32 and the lower portion of the interior of the front wall so as to form in effect a cylindrical recess into which the socket is fitted. An opening in the side of the socket retaining portion from which a tubular insert 48 is extended is provided for guiding and concealing the wiring connections to the socket. The fluorescent tube 36 is fitted into the socket in the usual manner and when a tube less than 72 inches long is used, the sockets may form its sole support. However, when a tube exceeding 72 inches in length is used, supporting clips 50 may be provided, soldered or otherwise attached to the interior surface of the front wall 34, as shown. A glass insulating tube 52 may be slipped over the fluorescent tube to be disposed at a point adjacent the clip support so that the clip embraces the insulating tube while the fluorescent tube is supported therein. The end portions 54, 56 of the front rail may comprise inserts soldered or brazed to the ends of the rail and are provided with holes to receive the screws for attachment to the side rails.

From the above description it will be seen that the present illuminated show case structure is such as to afford a maximum view of the interior of the show case, the illuminating element occupying a minimum space. Although, as herein illustrated, the invention is shown as embodied in the front rail of the show case structure, it will be apparent that the invention may be embodied in other rails of the structure if desired.

While the preferred embodiment of the invention has been herein illustrated and described, it will be understood that the invention may be embodied in other forms within the scope of the following claim.

Having thus described the invention, what is claimed is:

A show case having a frame, glass panels supported by said frame, and means for illuminating the interior of the show case comprising a hollow and relatively narrow elongated front rail secured to and forming a part of said frame, a recess formed in the upper wall of said rail for supporting the adjacent edge of the top glass panel, a groove formed in the side wall of said rail for receiving the adjacent edge of the front glass panel, an elongated and relatively narrow cold cathode fluorescent tube disposed within said hollow rail, a pair of sockets mounted within said front rail between which said tube is supported, means for supporting said sockets comprising spaced arcuate members formed integrally with said rail and forming therewithin substantially cylindrical portions in which the sockets are received, and means for supporting the mid-portion of said tube including a glass insulating member surrounding said tube, and a clip member secured to the interior of said rail and embracing said insulating member, said rail being open to the interior of the show case to permit illumination thereof, said combined rail and illuminating unit being relatively narrow to obstruct from view a minimum of the interior of the show case.

JOHN E. HOLMES.